Oct. 15, 1935.   T. W. ROLPH ET AL   2,017,075
LIGHTING SYSTEM
Filed Feb. 9, 1933    5 Sheets-Sheet 1

INVENTORS.
THOMAS W. ROLPH
HENRY L. LOGAN
BY
ATTORNEY.

Oct. 15, 1935.  T. W. ROLPH ET AL  2,017,075
LIGHTING SYSTEM
Filed Feb. 9, 1933  5 Sheets-Sheet 2

INVENTORS.
THOMAS W. ROLPH
HENRY L. LOGAN
BY
ATTORNEY.

Oct. 15, 1935.  T. W. ROLPH ET AL  2,017,075
LIGHTING SYSTEM
Filed Feb. 9, 1933    5 Sheets-Sheet 3

INVENTORS.
THOMAS W. ROLPH
HENRY L. LOGAN
BY Jules Shiberman
ATTORNEY.

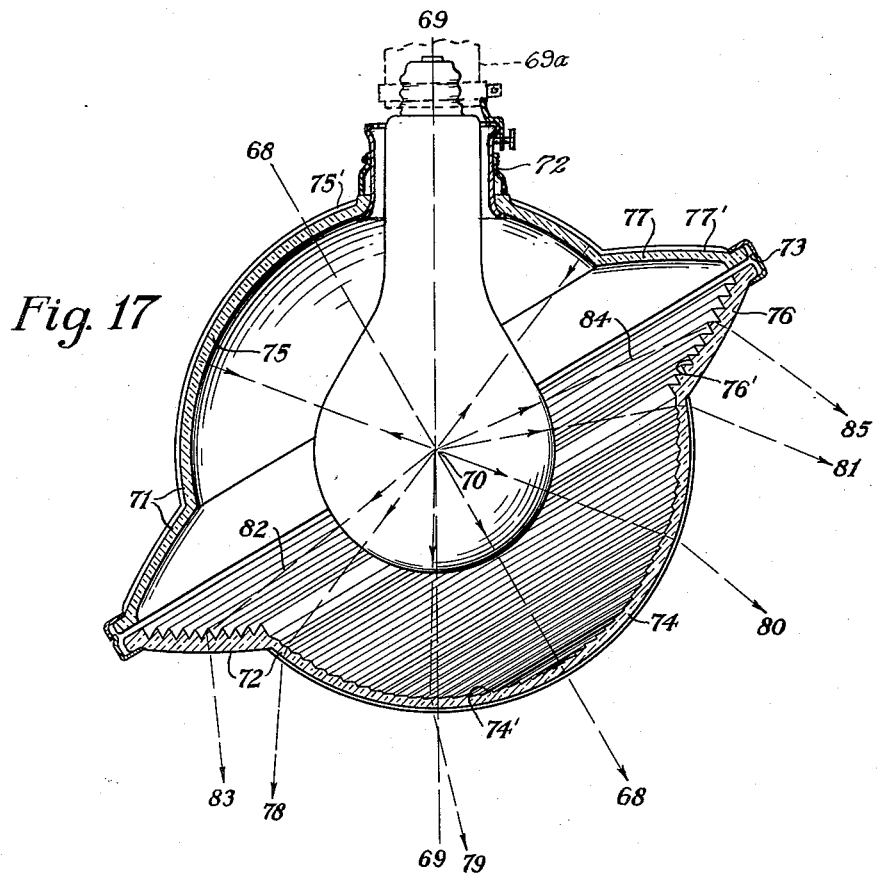
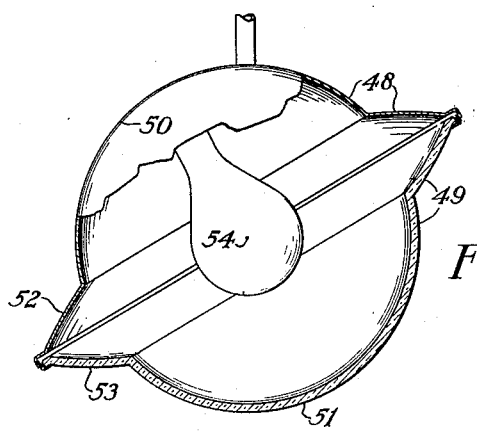

Patented Oct. 15, 1935

2,017,075

UNITED STATES PATENT OFFICE 2,017,075

LIGHTING SYSTEM

Thomas W. Rolph, Newark, Ohio, and Henry L. Logan, New Rochelle, N. Y., assignors to Holophane Company, Inc., New York, N. Y., a corporation of Delaware Application February 9, 1933, Serial No. 655,920

6 Claims. (Cl. 240—78)

The present invention relates to lighting systems and is more particularly directed toward the provision of an improved lighting system suitable for use in the lighting of displays such as walls and counters in stores. It also contemplates the provision of several forms of improved luminairs suitable for this purpose.

According to the most approved methods of retailing merchandise, it is desirable that every article for sale be displayed so that the attention of the prospective customer can be drawn to the merchandise. These displays are generally made by placing the merchandise on shelves along the lower part of the wall and on counters, so as to beckon the customer.

In order that the attention of the customer may be drawn to these displays, adequate and proper lighting is essential. The intense lighting of the displays from a general lighting system which floods the store with general illumination is unsatisfactory because it emphasizes the structural features and general background of the store at the expense of the merchandise. Such general lighting may subject the customer to such an annoying glare as to distract his attention from the goods which are being displayed.

The present invention contemplates a lighting system for stores and similar display areas according to which a plurality of lighting units of comparatively low current consumption are employed to produce a very intense illumination on the displays (shelving and counters), sufficient illumination in the center of the store to satisfactorily illuminate this area without subjecting the customer to annoying glare, and moderate illumination on the upper side walls and ceiling. In this way the advantages usually available in glareless show window illumination may be continued throughout the interior of the store so that the goods on the counters and shelves are displayed under ideal lighting.

The invention also contemplates the provision of luminairs adapted to be suspended in front of and above the counters, these luminairs being provided with light controlling and directing means whereby a controlled flood of light is directed obliquely downward toward the shelving and counters, and the spilled light may be employed for general illumination.

The luminair is designed to be preferably of a generally globular, or spheroidal shape, either curvilinear or faceted, but may consist of a hollow body of any suitable contour. It is divided along an oblique plane, passing substantially through the center of the structure. The lower portion of the luminair is translucent, and may be made of diffusing glass such as opal glass, although it is preferably made of prismatic glass. The upper portion of the luminair may be translucent or opaque. When made opaque, it is preferably in the form of a substantially hemispherical sheet metal stamping or spinning, although the shape may be somewhat altered from the true spherical shape. When the cover is translucent, it is preferably in the form of a prismatic glass reflector. The opaque cover member may itself be as a reflector, or one may employ a small separate inside reflector.

The accompanying drawings show, for purposes of illustrating the present invention, several embodiments in which the invention may take form, it being understood that the drawings are illustrative of the invention rather than limiting the same. In these drawings.

Figure 3:
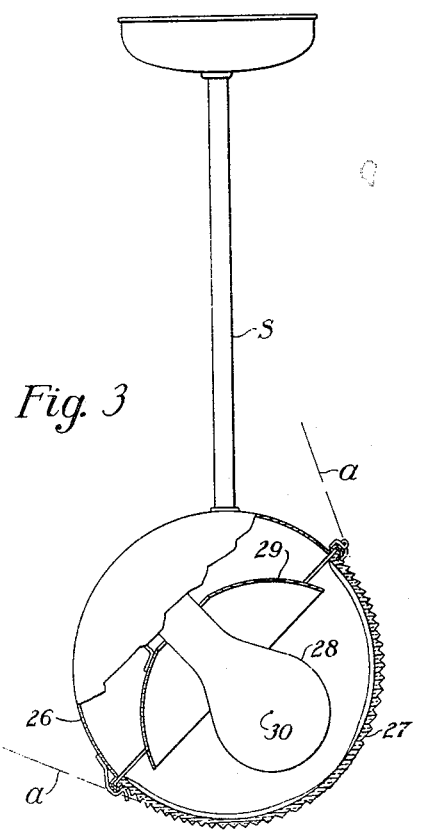
Fig. 3 is a cross-section of a typical form of luminair made according to the present invention.
Figure 7:
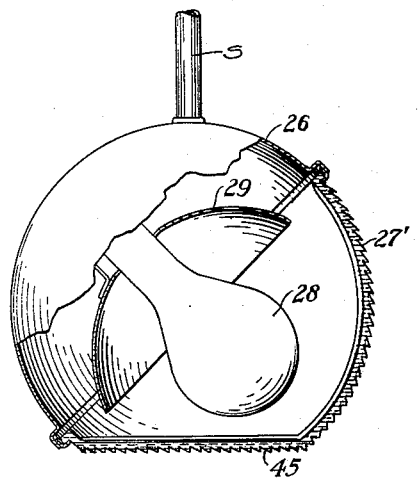
Fig. 7 is a view similar to Fig. 3 showing a similar type of luminair having a translucent member of slightly altered shape.
Figure 8:
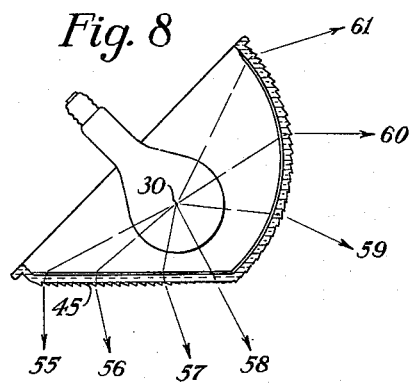
Fig. 8 shows redirection of light which may be obtained with the unit shown in Fig. 7.
Figure 10:
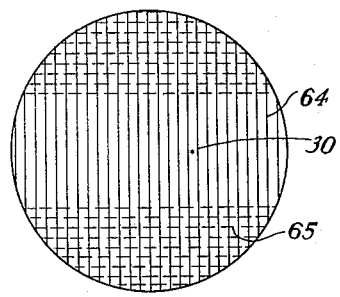
Figure 9:
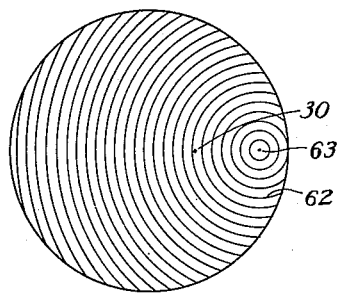
Figure 11:
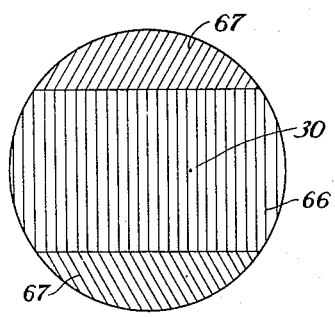
Figure 12:
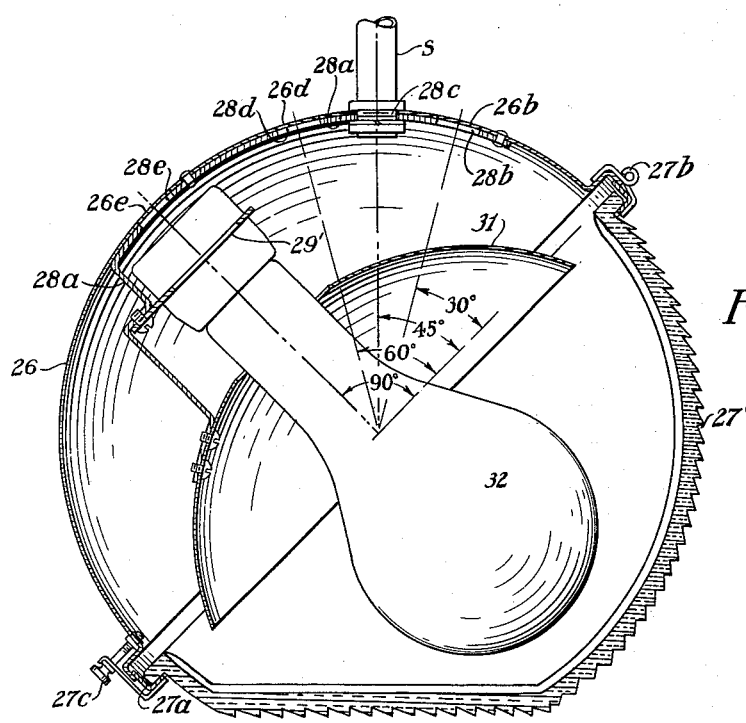
Figure 13:
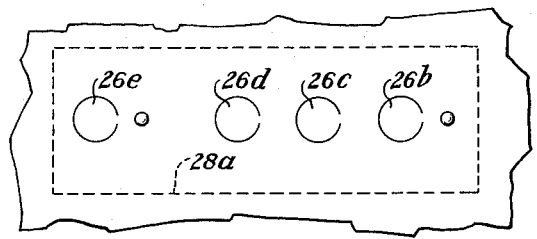
Figure 14:
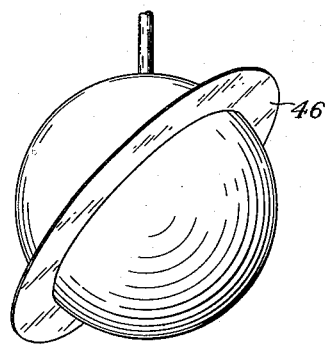
Figure 15:
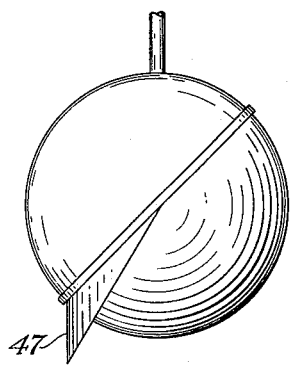

Figs. 9, 10, and 11 show in plan view the flat portion of the prismatic bowl of Figs. 7 and 8 and illustrate different arrangements of prisms for obtaining the desired lighting result;

Figs. 12 and 13 are sectional and elevational views of structural fixtures of luminairs such as shown in Figs. 3 and 7, illustrating means for mounting the luminair with the plane of division at varying angles;

Figs. 14 and 15 are perspective views showing, respectively, the employment of a supplemental ornamental band and a visor which may be applied to luminairs of the forms shown in Figs. 3 and/or 7;

Fig. 16 is a cross section of a modified form of luminair; and

Fig. 17 is a cross-section of a prismatic construction for the upper and lower parts of a luminair of the general shape of the unit illustrated in Fig. 16.

Figure 1:
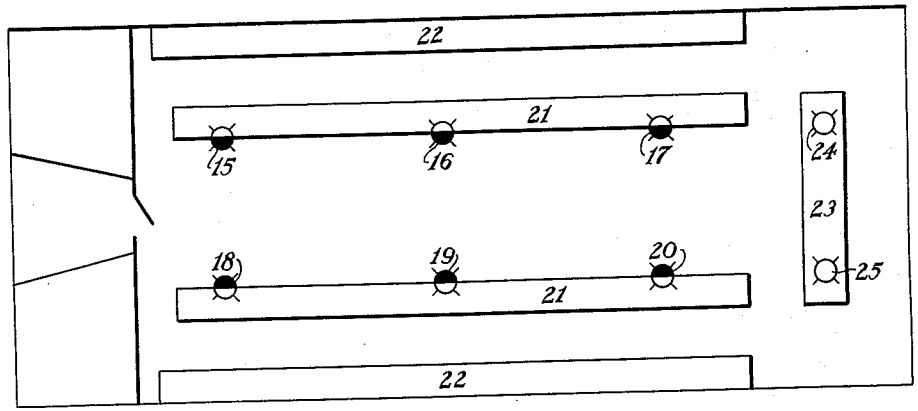
Fig. 1 shows a plan of a typical store using this new system of lighting.

The store shown in plan in Fig. 1 has a central space for customers. The counters are on each side. The lower portions of the walls are occupied largely with shelving on which displays are made. It is desirable to light these displays (counters and shelves) to a high intensity thus attracting the attention of customers and providing, in effect, the advantages of a show window inside the store. A moderate amount of illumination of the upper walls and ceiling is desirable, as well as adequate illumination of the central part of the store occupied by customers.

In Fig. 1, six of the asymmetric units of the type shown in the other figures of the drawing are used to illuminate the side wall display and the counters. These luminairs are indicated at 15, 16, 17, 18, 19 and 20. 21—21 are counters. 22—22 are wall displays. At the back of the store is a counter 23 which should also be lighted to a high intensity but since there is no wall display back of this counter, a symmetric unit may be used. The counter 23, therefore, is lighted by two symmetric units 24 and 25 which correspond in design to the asymmetric units 15 to 20 inclusive.

Figure 2:
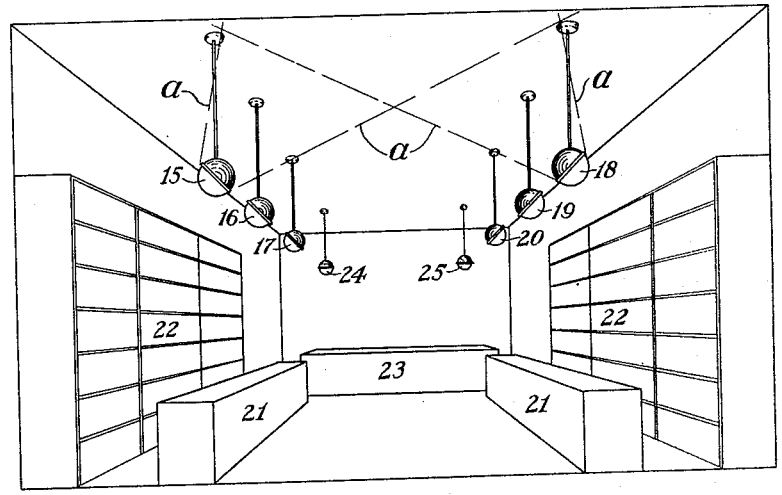
Fig. 2 shows an elevational and perspective view of this same store with the new luminairs in place.

Fig. 2 shows a perspective view of the store from the entrance and indicates more clearly the layout described in Fig. 1. The luminair counters and shelving are located and numbered the same as in Fig. 1.

Fig. 3 is a cross section of a form of luminair illustrated in Figs. 1 and 2. The luminair is carried by a suspension S, such as a tubular stem, and comprises a metal hemisphere 26 tipped at an oblique angle, a glass hemisphere 27 supported by the metal part, and an enclosed lamp bulb 28, tipped at an angle such that the lamp axis coincides with the optical axis of the luminair. Thus the complete unit is here shown as a sphere which, when lighted, is divided into a dark half and a light half. The inclination of the plane of division shown is 45° to the horizontal, but it may vary from about 30° to 60°. The dark half is tipped away from the display and the light half tipped toward the display. A spherical reflector 29 is placed over the lamp to return upward light rays back through the light center 30. If desired, shell 26 may be relied upon as a reflector. The hemisphere 27 may be made of opal or other diffusing glass, but preferably is a prismatic hemisphere designed for light center position at 30. It redirects the light of the lamp away from the ceiling and central part of the room and produces a controlled flood of light concentrated onto the shelving and counters. Thus a high intensity of illumination is built up on these parts. Spilled light is emitted through a wide angle, as indicated by the lines a, a (Figs. 2 and 3) so that there is adequate illumination in the central portion of the room and enough light on the ceiling to prevent a gloomy appearance.

Figure 4:
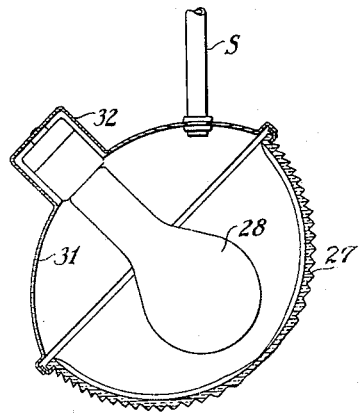
Fig. 4 is a view similar to Fig. 3 showing a luminair of slightly altered form above the plane of division.

In the form shown in Fig. 4, the upper part of the envelope is shown in the form of a spherical reflector 31, having a rearwardly extending protuberance 32 for the lamp socket.

Figure 5:
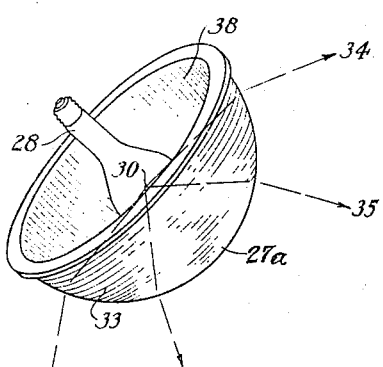
Figs. 5 and 6 show redirection of light with different types of prism constructions which may be used on the units in Figs. 3 and 4.

Fig. 5 indicates a form of prismatic construction used in the luminairs illustrated in Figs. 3 and 4. The prismatic hemisphere 27a is shown in perspective, tipped at an angle as used in the luminair. The lamp 28 with light-center 30 is also shown at the angle at which it is tipped in the luminair. The hemisphere 27a is provided on its outer surface with horizontal prisms indicated by the curved lines 33. These redirect the light away from the ceiling and central portion of the floor of the store to build up the illumination on the counter and wall displays. Typical light rays are indicated at 34, 35, 36 and 37. The interior of this prismatic hemisphere is provided with radial diffusing flutes indicated by the lines at 38. These provide lateral diffusion of the light and give the complete hemisphere a luminous and evenly lighted appearance, while not interfering materially with the redirection of light rays 34, 35, 36 and 37 in the general direction of counter and wall display.

Figure 6:
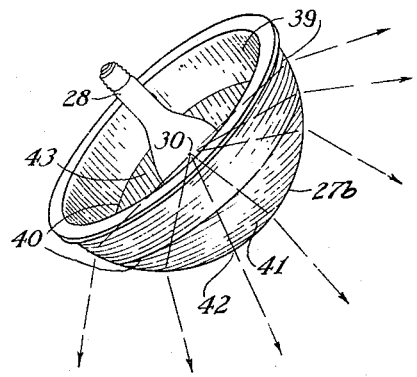

Fig. 6 illustrates another form of hemisphere which may be used in the unit shown in Figs. 3 and 4. The bowl 27b is of the same shape and general mechanical construction as in Figs. 3 and 5 and the lamp 28 with light-center 30 is also shown in the same position. The upper part of the hemisphere indicated at 39 carries the same form of prisms as shown in Fig. 5, viz., horizontal redirecting prisms on the outside and radial diffusing flutes on the inside. Below the line 40 this hemisphere carries another form of prismatic construction. The outside has a series of concentric prisms indicated by the lines at 41. The center 42 of this system of concentric prisms and the light-center 30 define a line which is the optical axis of the prismatic formation on this lower portion of the hemisphere. This optical axis is generally directed at an angle at which maximum candlepower is desired, viz., toward the lower portion of the wall display. On the inside of the hemisphere in this portion below the line 40, parallel prisms indicated by the solid lines 43 are provided. These supplement the concentric prisms on the outside and assist in the redirection of light in the desired manner for providing an approach to uniform illumination on the display.

Fig. 7 shows a variation from the precise hemispherical shape of the translucent element 27 of Fig. 3. The translucent element 27' may be made of opal or other diffusing glass. The lower portion is flattened as indicated at 45. This provides a surface which is more suitable for carrying prisms giving concentration of light. It permits control of the light in such a way that more light flux can be directed toward the bottom of the shelves, thus tending to provide more uniform illumination on the shelves or wall display and reduce glare on the customer. It also reduces the area of luminosity in horizontal directions.

Fig. 8 shows in cross-section the prismatic glass portion of the unit illustrated in Fig. 7. By flattening the hemisphere at one portion indicated at 45, light from the light source 30 may be directed into the desired downward directions more favorably than with a true hemispherical shape. This is indicated by typical light rays 55, 56, 57 and 58. These light rays are redirected by the flat prismatic section of the bowl so that they emerge in the general direction in which maximum candlepower is desired, viz., toward the counter and the lower part of the shelf display. Light rays striking the hemispherical portion of the bowl are indicated at 59, 60 and 61 and these serve to illuminate the upper portion of the wall display.

Fig. 9 shows one possible arrangement of prisms on the flat surface 45 of Figs. 7 and 8. In this figure the light center is indicated at 30.

A series of concentric prisms 62 may be used with the center of the system 63 placed at an angle from the light center 30 so that the optical axis points in the general direction in which maximum candlepower is desired. This optical axis is indicated by the light ray 30—58 in Fig. 8.

In Fig. 10 the flat portion of the bowl is provided on one side, preferably the lower side, with parallel prisms 64 indicated by the solid lines running in the general direction of the counters in the store. On the opposite side of the flat surface, supplementary parallel prisms indicated by the dotted lines 65 are provided in certain areas, running in directions perpendicular to prisms 64.

Another prismatic formation for this flat surface is indicated in Fig. 11. In this case an effect somewhat similar to that provided in the construction in Fig. 9 is obtained by the use of parallel prisms 66 in the central part of the plate running in the same direction as the counters in the store and diagonal prisms 67 provided in the outer sections of the surface.

Figs. 12 and 13 show a construction similar to Figs. 3 and 7 but devised for mounting the fixture with the plane of division at varying angles. The strap 28a is designed to fit close to the inside of the stamping of spinning 26 and is secured to it by rivets as indicated. This strap has holes 28b, 28c, 28d, and 28e spaced opposite knock-outs 26b, 26c, 26d, and 26e in the sheet metal member 26. The suspension S is shown as passing through the knock-out 26c and hole 28c so as to support the luminair with the plane of division at 45° from the vertical. When the suspension passes through hole 28b and corresponding knock-out hole, the fixture will have a plane of division at a different angle such as 30° from the vertical, while the hole 28d provides for an angle of inclination of 60°, and hole 28e for a horizontal plane of division. The structure herein shown may thus be used in installations requiring varying angles of the plane of division of the luminairs and yet the appearance of the luminair and structure will be substantially unchanged. The socket is supported on a detachable strap 29' to facilitate the wiring when the fixture is in the symmetric or 90° position. The glass bowl 27' is secured in a ring 27a hinged at 27b to the cover 26 and secured in closed position by a catch 27c.

Fig. 14 shows a modification applicable to units such as illustrated in Figs. 3 and 7, in which a band 46 has been added to the unit in order to produce a more interesting aesthetic effect and a certain degree of shielding of the bright hemisphere on the customers' side. This band is annular and is attached to the unit at the juncture of the metal and glass hemispheres. The band may be of metal, of glass, of some translucent substance other than glass, or of any material suitable for this purpose, plain or ornamented.

Fig. 15 illustrates the supplementing of the luminair with a visor-shaped appurtenance 47. It is attached on the customers' side of the unit and serves to act as a shield which lessens the candlepower of the light from the luminair toward the eyes of the customer. This visor-shaped shield may be made in a variety of shapes and using any material suitable for the purpose. When translucent material is used, the visor may be provided with lettering or illustrations for advertising purposes or for indicating the particular character of goods displayed opposite the luminair.

Fig. 16 shows a form of fixture which optically functions in generally the same manner as the fixtures of Figs. 3, 4, and 7. The metal cover 48 and translucent lower portion 49 have portions of spherical contour 50 and 51 and of conical or flatly curved contour as indicated at 52 and 53. The light center 54 is at the center of the sphere. The metal cover may be of a reflecting nature or a reflector may be used as shown in Figs. 3 and 7. The glass portions may be opal or may have a prismatic section, such as shown in Fig. 17. When the two pieces are fastened together they give the appearance of a sphere surrounded by a band tipped at an angle. The optical axis of the luminair is perpendicular to this band and the slope is such that the optical axis is generally directed toward the direction in which highest candlepower is desired, viz., the lowest point on which illumination is desired. This construction provides a shape on which prisms may be used to advantage to obtain high candlepower along the optical axis, and a uniform distribution of illumination over counter and wall display. The spilled light from this unit is, of course, confined to a narrower angle than in the forms of Figs. 3, 4, and 7.

Fig. 17 is a cross-section of a two part prismatic unit of the general shape of the unit shown in Fig. 16 and indicates a typical prismatic construction. It will be noted that the optical axis of the luminair indicated at 68 passes through the light center 70 but does not correspond to the axis of the lamp 69. The lamp is carried from a socket 69a in a pendant position with its axis vertical but the optical axis of the luminair coincides with the general direction in which maximum candlepower is desired which is typically, in this construction, about 30° from the vertical. From the mechanical standpoint, this unit comprises two glass pieces 71 and 72 joined in the center by metal band 73 and carried by a socket support 72a. From the optical standpoint the luminair may be more conveniently treated as a sphere showing two segments 74 and 75, and circumscribed by a protruding ring of wedge shaped cross section, made up of surfaces 76 and 77. The lower portion 74 of the spherical part will typically carry a series of concentric refracting prisms 74' increasing the concentration of light in the direction of the axis 68. This action is indicated by typical light rays 78, 79, 80 and 81. These prisms may be on the inside surface or the outside surface. They will usually be supplemented by a series of radial or parallel prisms on the opposed surface increasing or decreasing the concentration in certain directions so as to build up a high candlepower toward the bottom of the wall display area, yet permit lateral spread of light along the wall. On the upper portion of the sphere 75, reflecting prisms 75' are provided which return the light through the light source 70 to supplement the direct light striking the spherical section 74. These reflecting prisms permit some transmission of light to illuminate the ceiling to a low intensity and prevent a gloomy appearance.

The flattened curved section 76 may contain concentric refracting prisms 76' or it may contain concentric internal reflecting prisms of the single reflecting type. The latter are indicated in the drawing and the course of typical light rays acted upon by these prisms are indicated at 70—82—83 and 70—84—85. These prisms may be supplemented by prisms on the opposed surface, spreading laterally or otherwise modifying the light distribution obtained from them. This portion of the luminair adds to the concentration of light on the counter and lower portion of the wall display, but also provides some light on the upper portion.

The corresponding section 77 of the upper glass piece will usually carry concentric or radial reflecting prisms 77' cooperating with the prisms on 76. Radial prisms are shown in the figure. However, this section 77 may carry reflecting prisms tending to cooperate with the prisms on section 74. Considerable variation is possible in the types of cooperating prisms used in this general structure. The shape is a desirable one for carrying prismatic formations adapted to concentrate light on the shelving and counters. The transmitted and generally scattered light serves to illuminate the ceiling and the entire store but not to as high an intensity as provided on the counters and wall display.

This shape of luminair may also be made up having one or both pieces in the form of diffusing glass without the use of prisms. In that case the natural distribution of the globe itself will provide a higher candlepower in the direction of the optical axis than in other directions. The reason for this is that the projected area in the direction of the optical axis 68 is greater than in other directions, the minimum projected area being in directions perpendicular to the axis 68. When made in diffusing glass the two pieces may be of the same density or the upper half may have greater density than the lower half.

It will be noted that while this general shape is not symmetrical with reference to the vertical axis, the distribution of weight is symmetrical because the downward tipping of the ring on one side is compensated for by similar upward tipping on the other side. Therefore, the center of gravity is at the center of the sphere and the luminair will hang in the correct pendant position, even on a swinging support.

Any of the luminairs which embody this invention may use any type of glass but in general prismatic glass is preferred because prisms provide a means of redistributing the light of the lamp most efficiently and to best advantage for illuminating counters and wall displays to a high intensity. The type of lighting described herein utilizes the general lighting luminairs to provide lighting of an especially high intensity on wall displays and counters. This type of lighting is especially suitable for small stores with wall displays on both sides and one row of counters on each side of the store. It may also be used for still smaller stores where only a single row of counters is used on one side of the store. It may also be used for larger stores in which the lighting described herein is supplemented by lighting providing additional horizontal illumination in the central part of the store.

What is claimed is:

1. A luminair comprising a hemispherical sheet metal shell, means to support the shell with its lower edge in an oblique plane, a translucent hemispherical globe of substantially the same diameter as the shell fitted over the open side of the shell to form an envelope, a strap secured to the inside of the shell underneath the upper part of the shell, a lamp socket secured to the strap and adapted to carry a lamp bulb with the filament within the globe, and a reflector carried by the strap inside the shell.

2. A luminair comprising a hemispherical sheet metal shell, means to support the shell with its lower edge in an oblique plane, a translucent hemispherical globe of substantially the same diameter as the shell fitted over the open side of the shell to form an envelope, an interiorly disposed strap carried in the shell, a lamp socket secured to the strap with its axis substantially perpendicular to the oblique plane, a lamp bulb in the socket, and a reflector supported by the strap and disposed behind the filament of the lamp bulb, the supporting means including a suspension tube extending through the shell and strap at a point directly over the center of the sphere.

3. In a luminair, a substantially hemispherical sheet metal shell, an interiorly disposed strap curved to conform to the shell, a lamp socket secured to the strap adjacent the shell and in a position to have its axis substantially radial, the strap having a plurality of holes having predetermined angular relation to said axis, the shell having a knockout opposite each hole, and a suspension element adapted to be passed through any hole and the corresponding knockout for supporting the shell with its lower edge at a selected angle of inclination to the vertical.

4. A luminair having an envelope of spherical configuration, one half of which is opaque while the other half is translucent, an enclosed light source fixedly secured to the opaque half, the opaque half having a plurality of readily accessible points of securement for a suspension device located at predetermined angular distances from one another and the plane of division, and a suspension device cooperable with the opaque half at any such selected point.

5. A luminair comprising an envelope of generally globular shape, the upper portion being opaque, the lower portion being translucent and the plane of division between the two portions being tipped from the vertical axis, a lamp socket enclosed within the upper portion of the envelope, and a lamp bulb carried in the socket and projecting toward the lower portion, the bottom part of the translucent portion being flattened and of a prismatic formation to reduce the projected area of luminosity in horizontal planes.

6. A luminair as set forth in claim 5, wherein the translucent portion is prismatic and adapted to concentrate the light toward a downwardly oblique axis, and the prismatic formation of the flattened bottom part thereof is such as to substantially cut off light which would otherwise be emitted on the opposite side of the vertical from said axis.

THOMAS W. ROLPH.
HENRY L. LOGAN.